(12) United States Patent
Lu et al.

(10) Patent No.: US 6,823,113 B2
(45) Date of Patent: Nov. 23, 2004

(54) GRATING INTERFERENCE DEVICE WITH ADJUSTABLE RESOLUTION

(75) Inventors: Ying-Tsung Lu, Hsinchu Hsien (TW); Ching-Chin Wu, Taichung Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 17 days.

(21) Appl. No.: 10/242,752

(22) Filed: Sep. 13, 2002

(65) Prior Publication Data

US 2004/0013365 A1 Jan. 22, 2004

(30) Foreign Application Priority Data

Jul. 16, 2002 (CN) ............................................. 91115816

(51) Int. Cl.$^7$ ........................... G02B 6/34; G02B 27/44; G03H 1/04
(52) U.S. Cl. .............................. 385/37; 359/30; 359/34; 430/2
(58) Field of Search ............................. 385/37; 359/30, 359/31, 34; 430/1, 2

(56) References Cited

U.S. PATENT DOCUMENTS

| | | | | | |
|---|---|---|---|---|---|
| 4,093,339 | A | * | 6/1978 | Cross | 359/34 |
| 5,388,173 | A | * | 2/1995 | Glenn | 385/37 |
| 6,709,790 | B1 | * | 3/2004 | Gratrix | 430/1 |
| 2002/0114553 | A1 | * | 8/2002 | Mead et al. | 385/10 |

* cited by examiner

Primary Examiner—David V. Bruce
Assistant Examiner—Krystyna Suchecki
(74) Attorney, Agent, or Firm—Birch, Stewart, Kolasch & Birch, LLP

(57) ABSTRACT

A grating interference device with adjustable resolution has high stability and precision adjustment functions. The invention has two reflectors and a beam splitter. One of the reflector is installed on a rotating axis along with an optic fiber or a platform of planar waveguide. Through the rotating axis, this reflector and the platform are maintained at a fixed relative angle and rotate with respect to the other reflector and the beam splitter. The period of the interference grating is controlled by the angle change, producing a grating with a micrometer-order period on the optic fiber or the planar waveguide.

12 Claims, 4 Drawing Sheets

GRATING INTERFERENCE DEVICE WITH ADJUSTABLE RESOLUTION

This nonprovisional application claims priority under 35 U.S.C. § 119(a) on Patent Application No. 91115816 filed in Taiwan, R.O.C. on Jul. 16, 2002, which is herein incorporated by reference.

BACKGROUND OF THE INVENTION

1. Field of Invention

The invention pertains to a grating interference device used for photosensitive materials such as optic fibers or planar waveguides. In particular, the invention relates to a resolution adjustable grating interference device with a simple structure and high stability.

2. Related Art

Fiber gratings are often used in optoelectronic devices and have a lot of potential in future applications. Known fiber grating manufacturing methods include the phase mask method (or using other complicated devices) and the two mirror method. The phase mask method has a simpler structure, but it is not adjustable and more expensive. The two mirror method has a more complicate setup, but it is cheaper and adjustable.

To solve the problems in manufacturing and adjustment, there were many proposals in the past. For example, the U.S. Pat. No. 4,148,549 utilizes a multi-mirror structure with an adjustable period and tilt angles. There are three adjustable places and calibration is needed each time an adjustment is made. Therefore, this method is complicated in adjustment. The U.S. Pat. No. 4,807,950 uses a two-mirror structure. The structure is simpler but the adjustment is even harder. The system setup has to be modified every time an adjustment is required. The U.S. Pat. No. 5,309,260 also employs a multi-mirror setup and there are three adjustable places. Similarly, calibration has to be performed each time an adjustment is made. The U.S. Pat. No. 5,881,186 uses a phase grating structure. Although the setup is easier, it is not adjustable. From these references, one sees that there is no grating with a simple structure, an easy setup and an adjustable design.

SUMMARY OF THE INVENTION

It is an objective of the invention to provide a grating interference device with adjustable resolution. The disclosed device does not only have a simple structure and high stability, but also a sufficiently precise adjustment accuracy.

The disclosed grating interference device with adjustable resolution contains a beam splitter, two reflectors and a platform. The beam splitter separates an incident laser beam into two outgoing beams. The two reflectors are installed on the pathways of the two outgoing beams, changing their propagating directions toward the platform. The platform is fixed with a photo-sensitive material such as a planar waveguide or an optic fiber. The two reflected beams form an interference pattern on the photo-sensitive material, forming the desired interference grating.

The invention further allows one of the reflectors and the platform to rotate with respect to the beam splitter and the other reflector. This changes the incident angle of the reflected beams, thereby changing the period of the interference grating. Since the period is controlled by rotating the angle, the operation has high stability and accuracy.

On the other hand, one can also change the angle between the platform and one of the reflectors to form a tilt interference grating on the photo-sensitive material.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
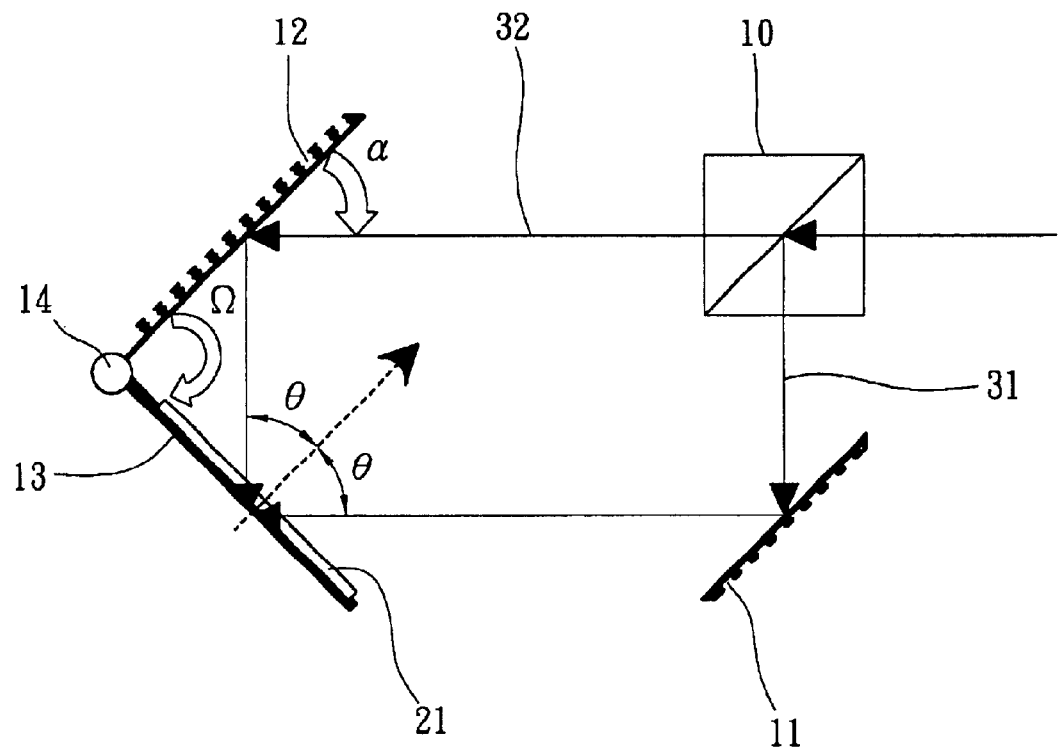
FIG. 1 is a schematic view of the disclosed system setup.

With reference to FIG. 1, the disclosed grating interference device with adjustable resolution contains a beam splitter 10, a first reflector 11, a second reflector 12, and a platform 13. An external beam 30, such as a collimated laser beam, falls on the beam splitter 10 and gets split into a first incident beam 31 and a second incident beam 32. Taking a 50/50 beam splitter as an example, the external beam splitter 30 is divided equally into two beams. The first reflector 11 and the second reflector 12 are installed on the pathways of the first incident beam 31 and the second incident beam 32, respectively, to change their propagating directions. The first incident beam 31 and the second incident beam 32 are then reflected to the same position on the platform 13.

Figure 2:
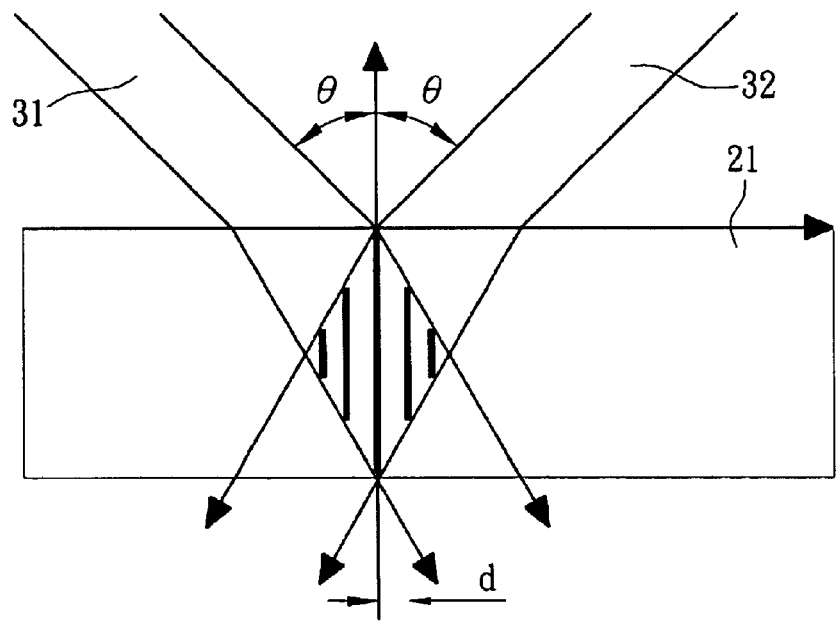
FIG. 2 is a schematic view of forming an interference grating.

The platform 13 provides a place for installing a photo-sensitive material, such as an optic fiber or a planar waveguide. The installation method can be clipping or attaching. When the two incident beams 31, 32 shine at the same place on the photo-sensitive material 21 at an incident angle θ, an interference grating is formed, as shown in FIG. 2. The grating period d can be obtained from the incident angle θ using the following formula:

$$d = \frac{\lambda}{2n_\lambda \sin\theta} = \frac{\lambda}{2\sin\theta}$$

Therefore, one only needs to control the incident angle θ of the first incident beam 31 and the second incident angle 32 in order to adjust the grating period d.

Figure 3:
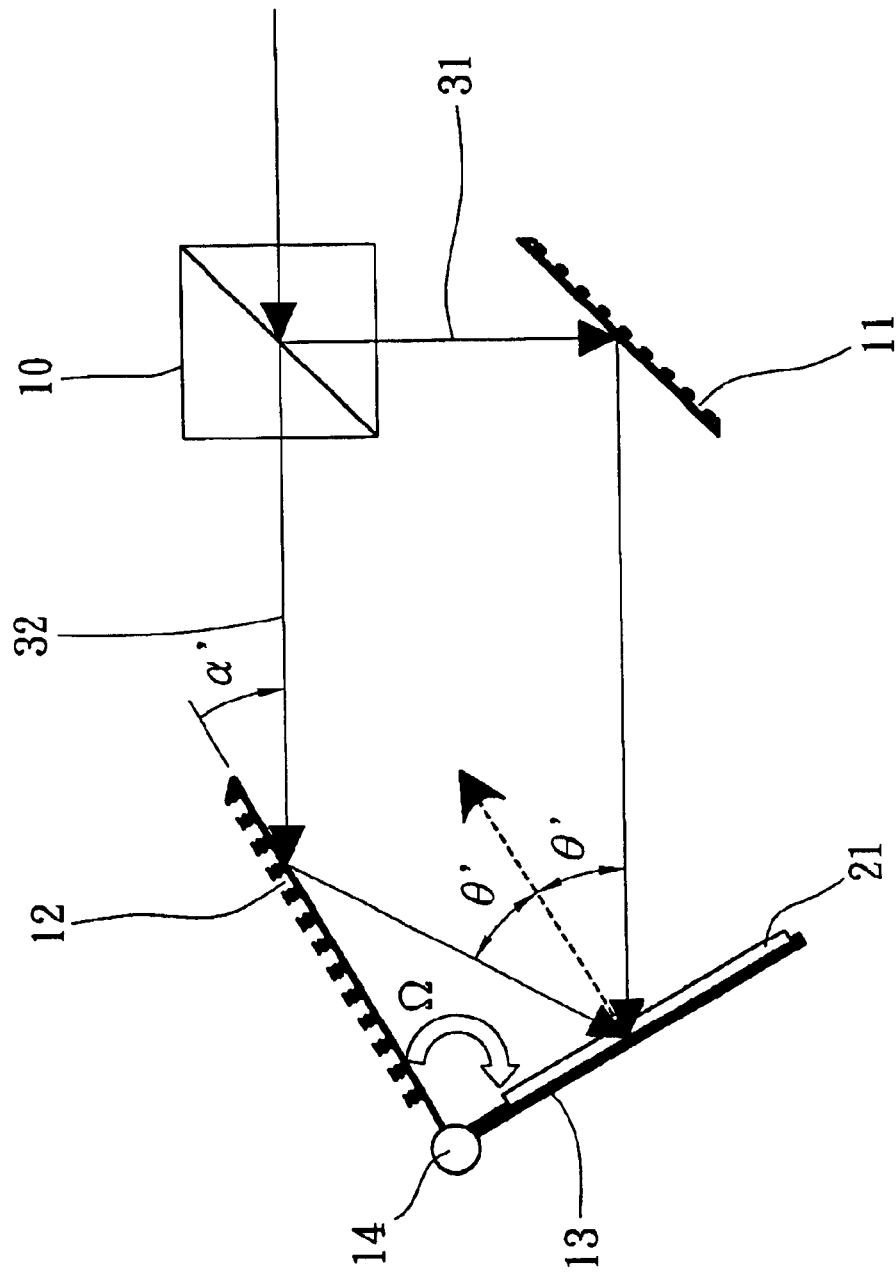
FIG. 3 is a schematic view of adjusting the period according to the invention.

To control the incident angle θ, the second reflector 12 and the platform 13 are connected using a rotating axis 14 on one end and the angle Ω between the second reflector 12 and the platform 13 is roughly 90 degrees (see FIG. 1). Through the rotating axis 14, the second reflector 12 and the platform 13 can simultaneously rotate with respect to the first reflector 11 and the beam splitter 10. The angle between the second incident beam 32 and the second reflector 12 goes from α to α' (FIG. 3), and the relative angle Ω between the second reflector 12 and the platform 13 is still maintained at roughly 90 degrees. Therefore, the incident angle θ of the first incident beam 31 and the second incident beam 32 also is changed to θ'. Consequently, the interference grating period d on the photo-sensitive material 21 is also changed (according to the above-mentioned formula). Of course, one can also design to have the second reflector 12 and the platform 13 on the same or independent rotators, instead of the rotating axis, in order to achieve the goal of rotating them with respect to the first reflector 11 and the beam splitter 10. In such a configuration, the second reflector 12 and the platform 13 do not need to be connected together on one end.

Figure 4:
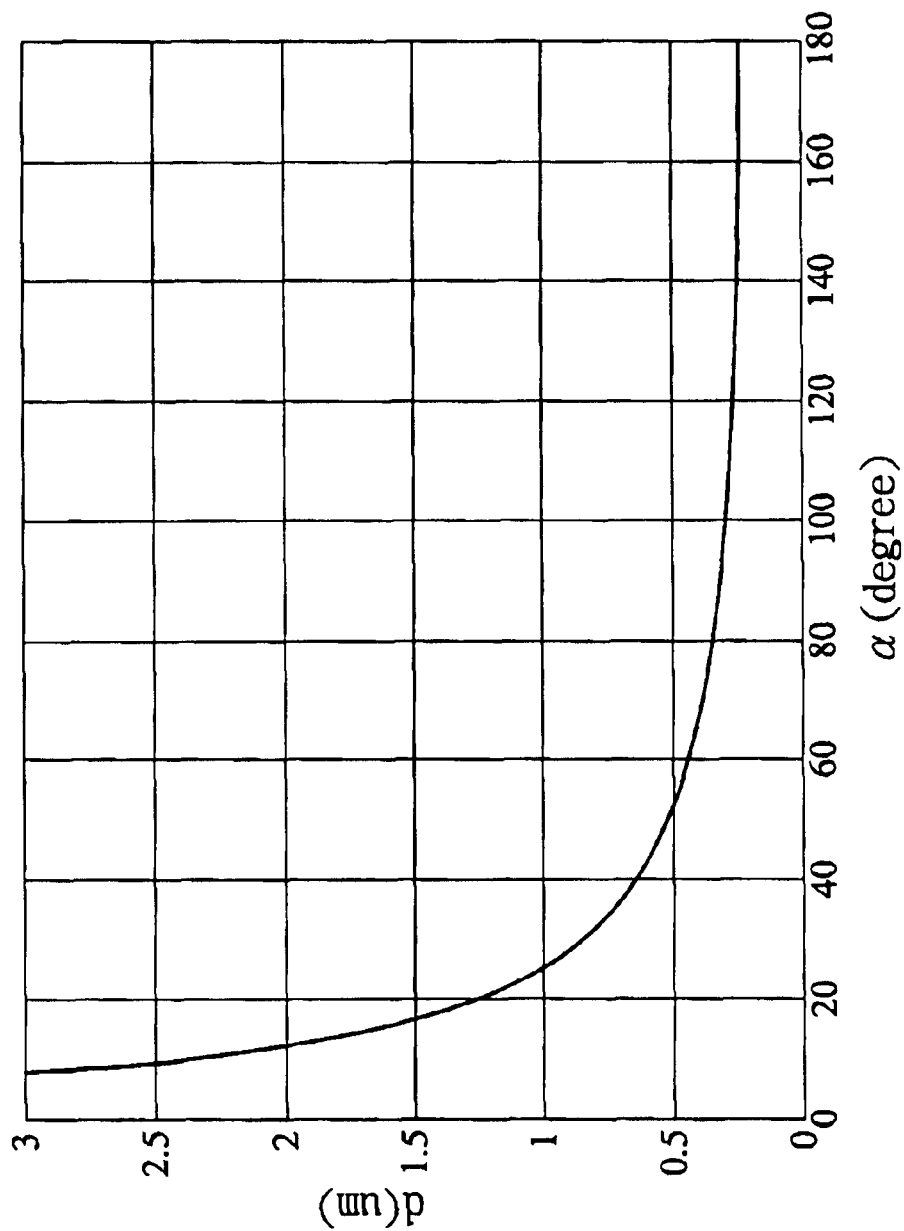
FIG. 4 is a schematic view showing the relation between the angle α and the grating period.

According to the rotating angle, we take a laser beam with the wavelength of 442 nm and the minimum grating period as 221 nm. A relation between the grating period d and the angle α is shown in FIG. 4. Since the angle α is controlled by the rotating axis 14 and it is fairly easy to achieve the accuracy of 0.01 degree in controlling the rotating axis using existing technology, the manufacturing cost is naturally lower than the prior, while the precision and stability become much better. One can see in the drawing that when α can be controlled to the precision of 0.01 degree, the grating period d can be readily adjusted to the precision at the sub-micrometer order.

To obtain a better interference pattern, the first incident beam 31 and the second incident beam 32 have to go through pathways of the same length after they are separated by the beam splitter 10 and before they reach the photo-sensitive material 21. This is why we use the design that the beam splitter 10, the first reflector 11, the second reflector 12 and the platform 13 roughly form a rectangle or parallelogram.

Figure 5:
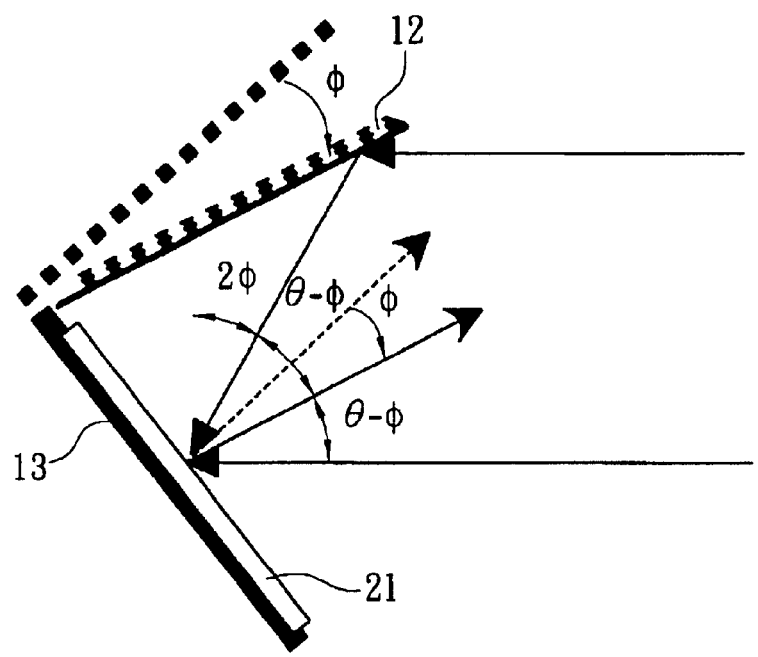
FIG. 5 is a schematic view showing the change in the angle between the reflector and the platform.
Figure 6:
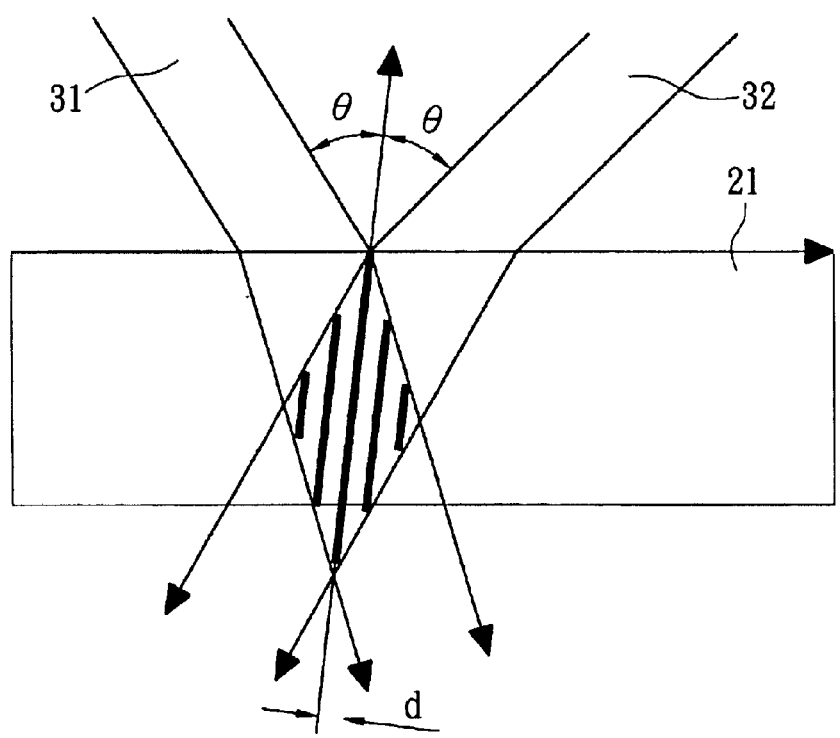
FIG. 6 is a schematic view of a tilt interference grating pattern formed according to the invention.

With reference to FIG. 5, if the second reflector 12 is allowed to rotate about the rotating axis 14, changing the angle Ω with the platform 13 (e.g. the second reflector 12 rotates an angle Φ toward the platform), then the second incident beam 32 has a different incident angle on the second reflector 12. This results in a different optical path for the second beam to the photo-sensitive material 21. Accordingly, the line that equally divides the angle between the first beam 31 and the second beam 32 on the photo-sensitive material 21 is no longer perpendicular to the surface of the photo-sensitive material 21. From the trigonometry and known angles, the equal-angle dividing line also rotates downward by an angle Φ, as shown in the drawing. Since the interference pattern is determined by the equal-angle dividing line of the two beams 31, 32, therefore what we obtain is a tilted interference pattern (see FIG. 6). The period of the interference grating is also determined according to the above-mentioned formula. However, the equal-angle dividing line rotates downward an angle Φ, the incident angle becomes θ−Φ. Similarly, one can simultaneously adjust the second reflector 12 and the platform 13 to rotate with respect to the first reflector 11 and the beam splitter 10 to obtain a desired interference pattern period.

Effects of the Invention

The invention provides a grating interference device with adjustable resolution. It uses the combination of two reflectors, a beam splitter, and a platform to generate desired interference gratings. The structure is simple and easy to set up. The period adjusting method is achieved by rotating the platform and one of the reflectors with respect to the other reflector and the beam splitter. The period is adjusted through the control of the angles. Thus, the invention can produce gratings with the sub-micrometer order precisions. Furthermore, the angle between the rotating reflector and platform to produce tilt interference gratings for special needs.

What is claimed is:

1. A grating interference device with adjustable resolution for using an external laser beam to generate an interference grating, the grating interference device comprising:

a beam splitter splitting the external laser beam into two beams traveling in different directions;

a first reflector installed on the pathway of one of the outgoing beams from the beam splitter to change its propagating direction;

a second reflector installed on the pathway of the other outgoing beam from the beam splitter to change its propagating direction;

a platform providing the installation of a photo-sensitive material for the beams reflected by the first reflector and the second reflector to form an interference grating at the same place on the photo-sensitive material;

wherein the second reflector and the platform are simultaneously rotatable with respect to the first reflector and the beam splitter, thereby changing the incident angle of the beams on the platform.

2. The grating interference device of claim 1, wherein the second reflector and the platform are roughly perpendicular to each other.

3. The grating interference device of claim 1, wherein the beam splitter divides the external laser beam into two beams with equal intensity.

4. The grating interference device of claim 3, wherein the beam splitter is a 50/50 beam splitter.

5. The grating interference device of claim 1, wherein the two beams travel optical paths of the same length after they are split by the beam splitter and before they reach the photo-sensitive material.

6. The grating interference device of claim 1, wherein the photo-sensitive material is selected from the group consisting of a planar waveguide and an optic fiber.

7. The grating interference device of claim 1, wherein one end of the platform and one end of the second reflector are mounted together on a rotating axis with an angle subtended in between.

8. The grating interference device of claim 7, wherein the platform and the second reflector rotate about the rotating axis with respect to the first reflector and the beam splitter, with the subtended angle fixed.

9. The grating interference device of claim 7, wherein the second reflector and the platform rotate about the rotating axis with respect to each other so that the subtended angle changes.

10. The grating interference device of claim 9, wherein a tilt interference grating is formed on the photo-sensitive material from the two beams by changing the angle between the second reflector and the platform.

11. The grating interference device of claim 1, wherein the platform and the second reflector are mounted together for simultaneous rotation.

12. The grating interference device of claim 1, wherein said first reflector is fixed while the second reflector and platform rotate together to change the incident angle.

* * * * *

UNITED STATES PATENT AND TRADEMARK OFFICE
CERTIFICATE OF CORRECTION

PATENT NO. : 6,823,113 B2
DATED : November 23, 2004
INVENTOR(S) : Ying-Tsung Lu and Ching-Chin Wu It is certified that error appears in the above-identified patent and that said Letters Patent is hereby corrected as shown below:

<u>Title page,</u>
Item [30], Foreign Application Priority Data, please change "(CN)" to -- (TW) --

Signed and Sealed this

Fifth Day of July, 2005

JON W. DUDAS
*Director of the United States Patent and Trademark Office*